US009405360B2

(12) United States Patent
Ang (10) Patent No.: US 9,405,360 B2
(45) Date of Patent: Aug. 2, 2016

(54) IP CAMERA SMART CONTROLLER

(71) Applicant: Richard Ang, Medina, WA (US)

(72) Inventor: Richard Ang, Medina, WA (US)

(*) Notice: Subject to any disclaimer, the term of this patent is extended or adjusted under 35 U.S.C. 154(b) by 209 days.

(21) Appl. No.: 14/499,165

(22) Filed: Sep. 27, 2014

(65) Prior Publication Data

US 2015/0264322 A1 Sep. 17, 2015

Related U.S. Application Data

(60) Provisional application No. 61/952,328, filed on Mar. 13, 2014.

(51) Int. Cl.
*H04N 7/18* (2006.01)
*G06F 3/00* (2006.01)
*H04N 5/232* (2006.01)
*H04N 5/225* (2006.01)

(52) U.S. Cl.
CPC .............. *G06F 3/005* (2013.01); *H04N 5/2251* (2013.01); *H04N 5/23206* (2013.01); *H04N 5/23245* (2013.01); *H04N 7/188* (2013.01)

(58) Field of Classification Search
CPC ............ H04N 5/2251; H04N 5/23206; H04N 5/23245; H04N 7/188; G06F 3/005
USPC .......... 348/143, 156, 153, 159, 161; 386/200, 386/226, 230
See application file for complete search history.

(56) References Cited

U.S. PATENT DOCUMENTS

| 2011/0055606 A1* | 3/2011 | Wu ....................... G06F 1/3203 713/323 |
| 2014/0162598 A1* | 6/2014 | Villa-Real ............... H04M 1/66 455/411 |
| 2016/0025366 A1* | 1/2016 | Snow .................... F24F 11/006 700/276 |

* cited by examiner

*Primary Examiner* — Robert Chevalier
(74) *Attorney, Agent, or Firm* — Seattle Patent Group LLC; James Haugen (57) ABSTRACT

The instant application discloses, among other things, an IP Camera Smart Controller. In one embodiment, the IP Camera Smart Controller may comprise an internet protocol (IP) camera configured to detect whether a garage door is open or closed. It may be able to transmit real-time images and live high-definition (HD) video, as well as email, text, or audio notifications to users regarding the status of the door. In another embodiment, the IP Camera Smart Controller may be configured to allow a user to monitor and control any object such as light switches, power outlets, fire and carbon monoxide detectors, appliances, and motor vehicles, for example. The IP Camera Smart Controller may contain software written specifically to run inside the camera unit, eliminating the need for additional controlling units, web servers, and wireless accessories.

11 Claims, 10 Drawing Sheets

IP CAMERA SMART CONTROLLER

FIELD

This disclosure relates generally to the field of communications and, more particularly, to an Internet Protocol (IP) Camera Smart Controller.

BACKGROUND

Many consumers seek to enhance their everyday lives by integrating objects such as mobile devices, fixtures, or appliances, for example, through computer networks that may give users centralized control and remote access through the Internet. The so-called "Internet of Things," a term to describe the increasing connectivity of people and objects to the Internet, may help consumers achieve efficiency, security, and simplicity in this complex digital age. However, such integration of multiple devices typically requires the costly and cumbersome implementation of controlling units or server hubs to manage and view the devices and connections, as well as multiple devices and accessories.

IP cameras are mostly used as passive viewing devices accompanying a separate controlling unit. It is also sometimes used for motion detection, but sometimes give false positives. For example, changing lighting conditions or other environmental factors that can trigger motion sensing techniques.

SUMMARY

The following presents a simplified summary of the disclosure to provide a basic understanding to the reader. This summary is not an extensive overview of the disclosure, nor does it identify key or critical elements of the claimed subject matter, or define its scope. Its sole purpose is to present some concepts disclosed in a simplified form as a precursor to the more detailed description that is later presented.

The instant application discloses, among other things, an internet protocol (IP) Camera Smart Controller. In one embodiment, the IP Camera Smart Controller may comprise an IP camera configured to detect whether a garage door, a gate, another type of door, or a window is open or closed. The IP Camera Smart Controller may have the capability to transmit real-time images and live high-definition (HD) video, as well as email, text, or audio notifications to users regarding the status of the garage door in real time. In one embodiment, the IP Camera Smart Controller may give users full control of the camera with pan and tilt capabilities, night vision, and two-way communication, for example. The IP Camera Smart Controller may contain software written specifically to run inside the camera unit, which may allow it to function as an integrated controlling and monitoring unit, which may eliminate the need for additional controlling units, web servers, and wireless accessories.

In another embodiment, the IP Camera Smart Controller may be configured to allow a user to monitor and control light switches, power sockets, fire and carbon monoxide detectors, appliances, and motor vehicles, for example. A person skilled in the art will understand that an IP Camera Smart Controller may be configured to operate with any device, including but not limited to computers, tablets, and smartphones. IP Camera Smart Controller may include any attachment means, for example screws, bolts, Velcro, or clamps.

Many of the attendant features may be more readily appreciated as they become better understood by reference to the following detailed description considered in connection with the attached drawings.

DETAILED DESCRIPTION

The instant application discloses, among other things, an internet protocol (IP) Camera Smart Controller. In one embodiment, the IP Camera Smart Controller may comprise an IP camera in conjunction with a sensor configured to detect, for example, whether a garage door, a gate, another type of door, or a window is open, closed, opening or closing. For example, a garage door may have a magnetic sensor electrically coupled to the IP Camera Smart Controller, which may allow for detection of whether a garage door is opened or closed. The IP Camera Smart Controller may have the capability to transmit real-time images and live high-definition (HD) video, as well as email, text, or audio notifications to a user regarding the status of the garage door in real-time, allowing the user to verify the status visually. A notification may also be sent to a cloud-based server for additional security and backup. The notification may also include time stamps, allowing the user to verify that the notification is timely. Using a sensor, such as a magnetic switch, may reduce false positives, which may in turn reduce unnecessary notifications to the user. In one embodiment, the IP Camera Smart Controller may give users full control of the camera with pan and tilt capabilities, night vision, and two-way communication, for example. The IP Camera Smart Controller may contain software written specifically to run inside the camera unit, eliminating the need for additional controlling units, web servers, and wireless accessories.

In another embodiment, the IP Camera Smart Controller may be configured to allow a user to monitor and control light switches, power sockets, fire and carbon monoxide detectors, appliances, and motor vehicles, for example.

The IP Camera Smart Controller may reduce potential failure points by reducing the number of components required to operate. For example, having a camera, processor, and memory coupled directly, Ethernet and wireless networking issues to an external computer may be prevented. Performance may also be enhanced.

IP Camera Smart Controller may be easily installed, with software that may eliminate the need to establish port forwarding on a router when communicating with user devices, such as iOS, Android, or Windows devices running native applications. IP Camera Smart Controller may also include software that may prevent false positives or false negatives after power failures or power spikes. For example, the software may intelligently map registry and configuration settings to ensure consistency of state. In the event of a power interruption, the software may do all the necessary cross-checking and validation to ensure stable and consistent state, and may self-correct where appropriate. For example, there may be many controls for switches and ports inside the camera unit that can be triggered, for example, for alarms, siren, or detecting door status of opened or closed. There may be multiple trigger points on different events. With the proper use of callback mechanisms and software checking, the software may detect an event that matters and ensure that other events affecting the controls and ports are isolated from each other to ensure a consistent state. This way, when power failure or spikes occur, it will not leave a registry or configuration setting in an incorrect state which may trigger a false detection or the false control of devices. For example, the camera controlling unit may not mistakenly open a garage door in the event of a power interruption or spike.

A person skilled in the art will understand that an IP Camera Smart Controller may be configured to operate with any device, including but not limited to computers, tablets, and smartphones. IP Camera Smart Controller may include any attachment means.

Many of the attendant features may be more readily appreciated as they become better understood by reference to the following detailed description considered in connection with the attached drawings, in which like parts are indicated with like numerals.

Figure 1:
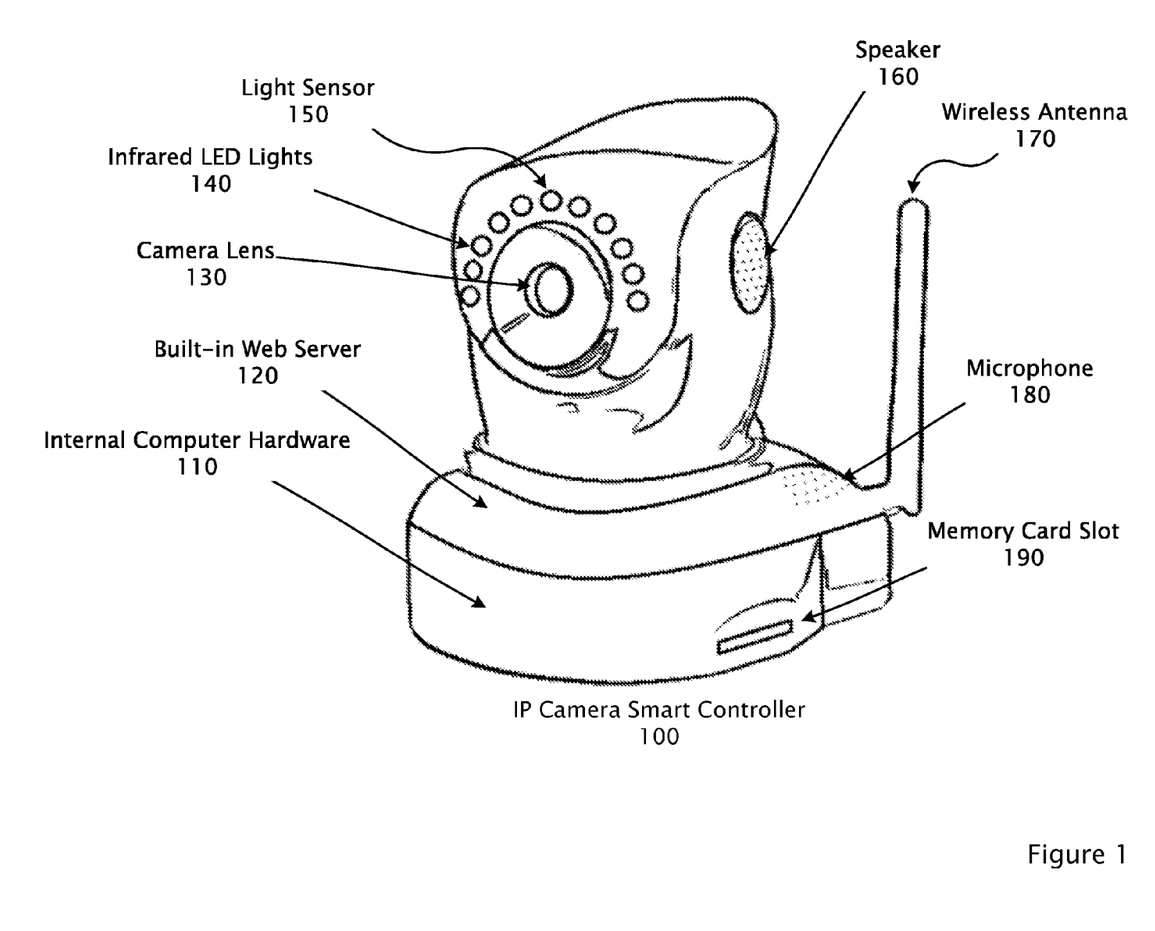
FIG. 1 is a front perspective view of an IP Camera Smart Controller, according to one embodiment.

FIG. 1 is a front perspective view of IP Camera Smart Controller 100, according to one embodiment. In this example, IP Camera Smart Controller 100 may comprise an internet protocol (IP) camera with Internal Computer Hardware 110 built into the camera housing. Software that has been written specifically for IP Camera Smart Controller 100 may run on the Internal Computer Hardware 110. The software may enable IP Camera Smart Controller 100 to function as a controlling unit for any single or plurality of objects, such as garage doors, light switches, power sockets, fire detectors, carbon monoxide detectors, appliances, and motor vehicles, for instance.

Software running on Internal Computer Hardware 110 may interact directly with Built-in Web Server 120. Built-in Web Server 120 may be configured to send and receive data so as to allow a user to remotely monitor, control, and receive notifications about object. Built-in Web Server 120 may also be used to authenticate the users using various methods such as Digest or Basic Authentication and utilizing http or https. A user may send and receive the information through any device, such as a computer or a smartphone, for example. IP Camera Smart Controller 100 may connect to the Internet and other devices by an Ethernet Cable 185 or any wireless means such as Wi-Fi, using its Wireless Antenna 170. IP Camera Smart Controller 100 may also be equipped with Bluetooth, near-field communication (NFC), and other wireless capabilities.

IP Camera Smart Controller 100 may include a Camera Lens 130 with any range of zoom capabilities and may be capable of capturing and transmitting high-definition (HD) still and video images in various resolution settings. IP Camera Smart Controller 100 may also have full pan-tilt control, allowing it to engage in vertical, horizontal, upward, and downward movements, for example. Infrared LED Lights 140 and Light Sensor 150 may provide night vision capability, enabling IP Camera Smart Controller 100 to function in low-light or pitch black environments. Speakers 160 and Microphone 180 may allow for two-way communication through IP Camera Smart Controller 100. IP Camera Smart Controller 100 may store data directly into the camera unit or on any other memory device, for instance, a secure digital (SD) card, which may be inserted into Memory Card Slot 190.

In the context of garage doors, IP Camera Smart Controller 100 may be configured to detect whether a garage door is opened or closed. It may also be capable of transmitting still or video images, as well as sending alerts to users in the form of text messages, emails, or audio notifications, for example. IP Camera Smart Controller 100 may allow a user to monitor, control, and receive information on any device, including but not limited to personal computers, tablets, or smartphones, which may run on any operating system such as Windows, Macintosh, iOS, or Android, and which may utilize any web browser such as Internet Explorer, Chrome, Firefox, Opera, and Safari, for example.

Figure 2:
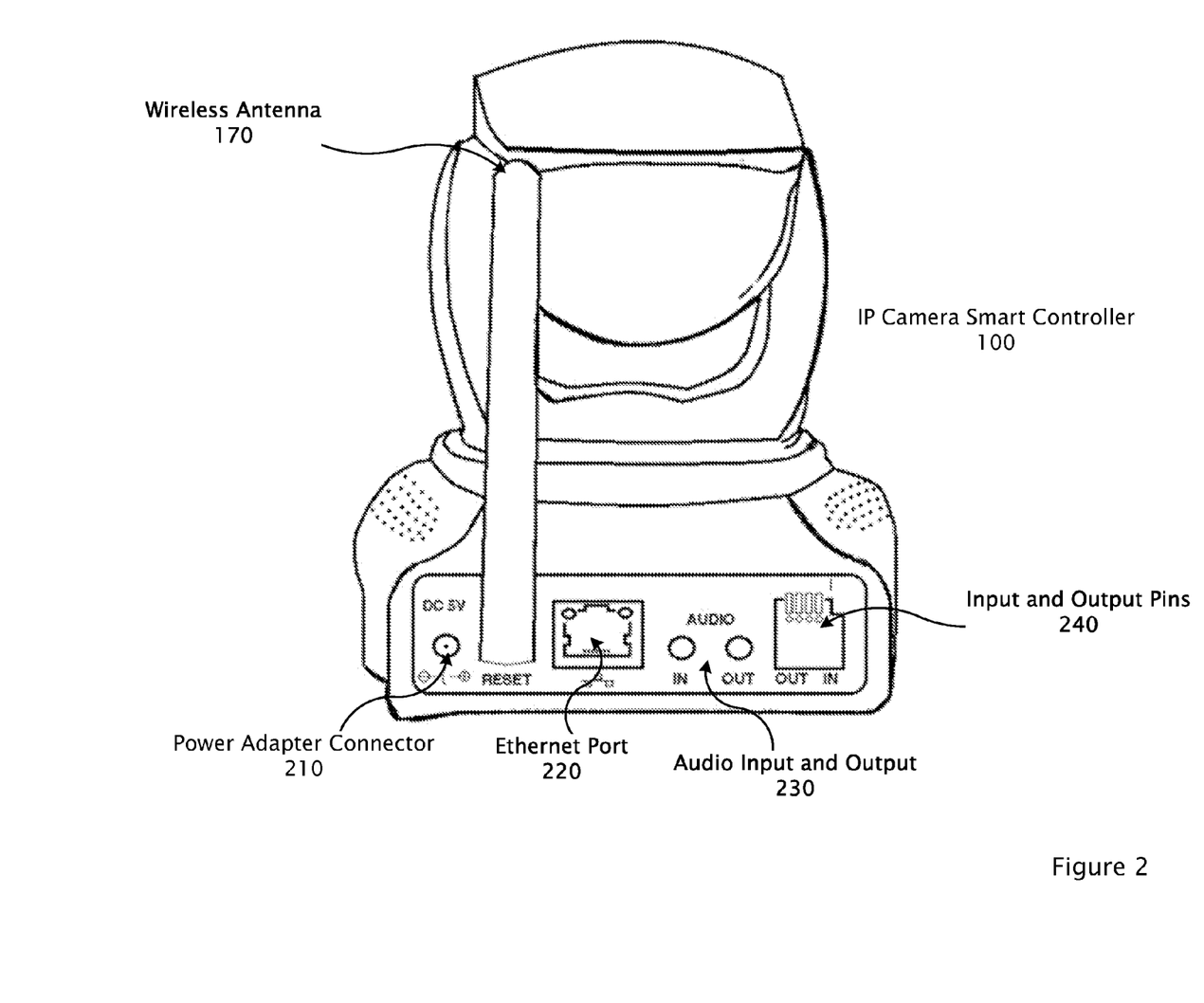
FIG. 2 is a rear view of an IP Camera Smart Controller, according to one embodiment.

FIG. 2 is a rear view of an IP Camera Smart Controller 100, according to one embodiment. The rear side of IP Camera Smart Controller 100 may include Power Adapter Connector 210, Wireless Antenna 170, Ethernet Port 220, Audio In and Out Ports 230, and Input and Output Pins 240 for a garage connection. Power Adapter Connector 210 may allow IP Camera Smart Controller to connect to any power source, for example, an electrical outlet. Wireless Antenna 170 may be detachable and enable any wireless communications such as Wi-Fi, for instance. Ethernet Port 220 may enable a user to connect IP Camera Smart Controller 100 to the Internet or any other network and may also be used as a power source utilizing Power over Ethernet, for example, a user may do this in order to establish a network ID.

Audio Input and Output 230 may allow a user to connect IP Camera Smart Controller with any other devices such as external headphones, speakers, amplifiers, or microphones.

Input and Output Pins 240 may connect to a device, switch, or sensors, for example, an electronic garage door opening and closing sensor monitor. Two pins of Input and Output Pins 240 may communicate with any object such as a Magnetic Switch, sensor detector, or a garage door remote control. Software running on Internal Computer Hardware 110 may use these two output pins to facilitate the control of any object. For example, they may enable the opening and closing of a garage door. The software may be engineered in such a way as to ensure that safeguards are in place to, for instance, prevent a garage door from opening on its own in the event of a power spike.

Two pins of Input and Output Pins 240 may comprise input pins which may connect to any object, for example, to a detection sensor switch of a garage door opening Monitor. The software running on Internal Computer Hardware 110 may use these two input pins to detect the opening and closing of the garage door or any other object.

One having skill in the art will recognize that multiple inputs and outputs may be used to control and monitor any number of devices.

Figure 3:
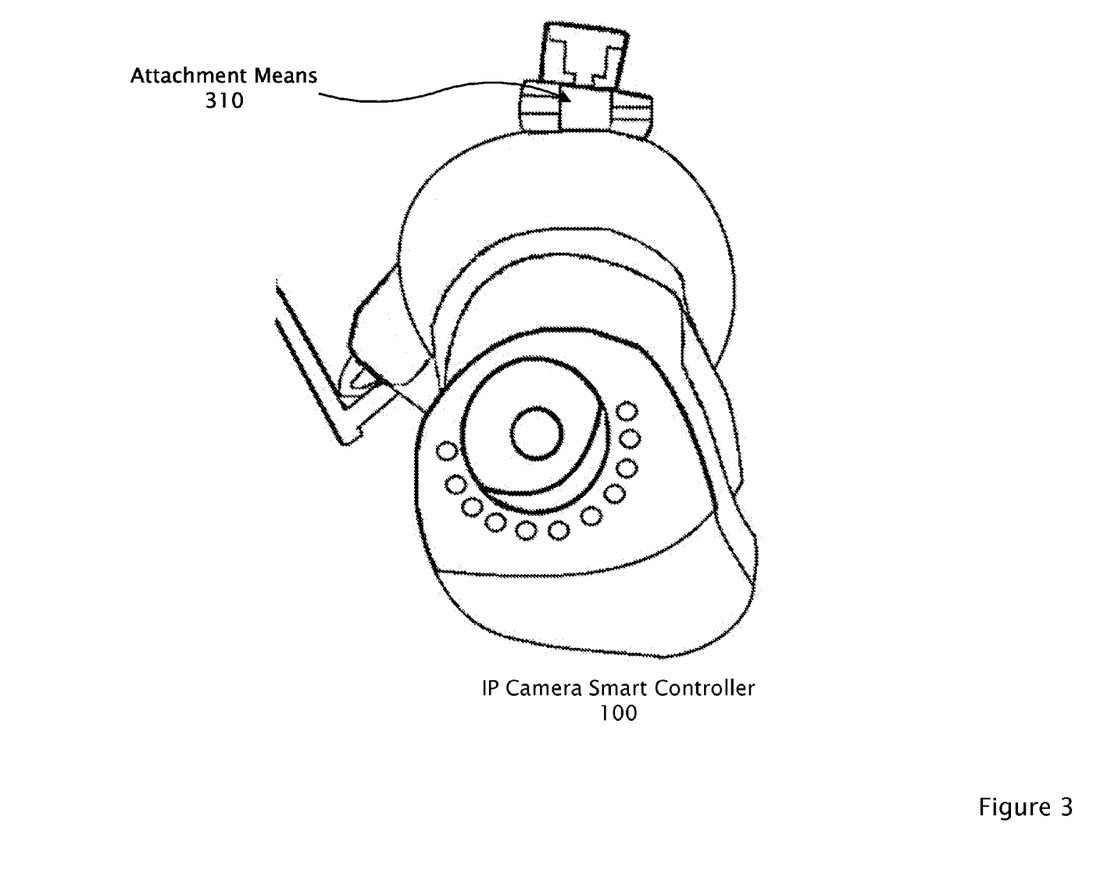
FIG. 3 illustrates an IP Camera Smart Controller mounted, according to one embodiment.

FIG. 3 illustrates an IP Camera Smart Controller 100 mounted, according to one embodiment. In this example, IP Camera Smart Controller 100 may be mounted upside down on a garage ceiling by an Attachment Means 310. IP Camera Smart Controller 100 may be electrically coupled with Magnetic Switch 410, shown in FIG. 4, for open and close detection.

Attachment Means 310 may include wall mounts, ceiling mounts, stands, flexible mounting heads, or any other way of attaching IP Camera Smart Controller 100 to a position.

Figure 4:
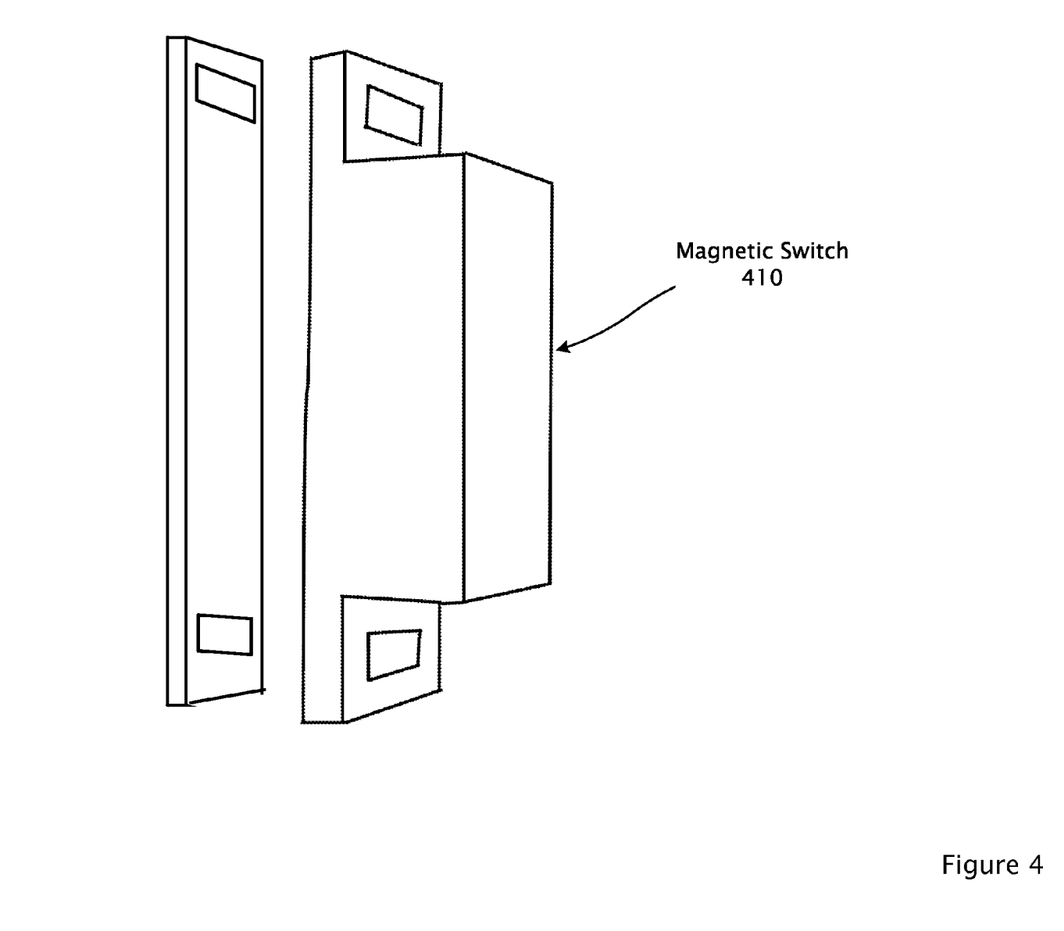
FIG. 4 illustrates a working switch connected to an IP Camera Smart Controller, according to one embodiment.

FIG. 4 illustrates Magnetic Switch 410, which may be coupled to IP Camera Smart Controller 100, according to one embodiment. One side of Magnetic Switch 410 may connect to the garage frame door, and another may connect to the garage door itself. One wire may connect to the common connector, and the other wire may connect to a normally closed (NC) or a normally open (NO) connection. Software running on Internal Computer Hardware 110 may detect the opened or closed status of Magnetic Switch 410 which may correspond to a garage door being open or being closed.

One having skill in the art will recognize that other types of switches may be used for similar or other desired functionalities.

Figure 5:
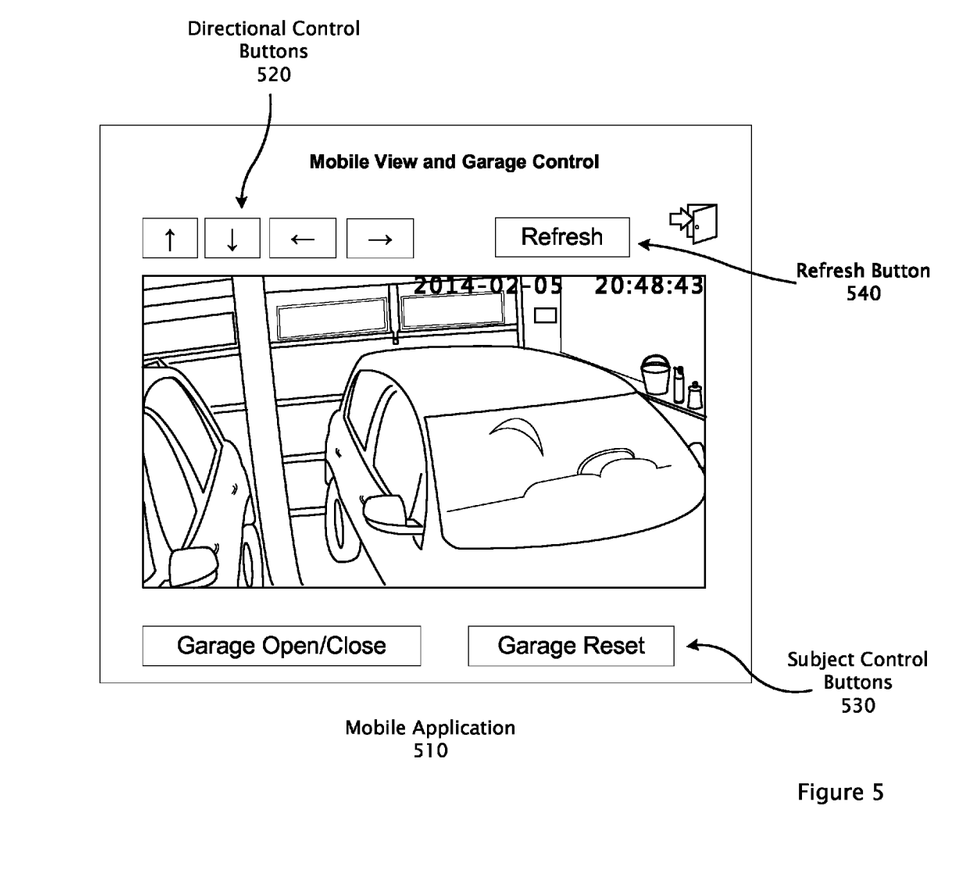
FIG. 5 illustrates a mobile application utilizing an IP Camera Smart Controller, according to one embodiment.

FIG. 5 illustrates a Mobile Application 510 utilizing an IP Camera Smart Controller, according to one embodiment. In this example, Mobile Application 510 may use an internet browser, such as Internet Explorer, Safari, Chrome, Firefox and Opera, and may operate on a device, including but not limited to computers, tablets and smartphones. This example includes an image taken in a dark environment to illustrate the night vision capability of IP Camera Smart Controller 100.

Mobile Application 510 may display Directional Control Buttons 520, which may allow a user to pan, tilt, and move the IP Camera Smart Controller 100, and its image display, in any direction such as up, down, left, and right. The still-image or video display of a subject such as a garage, for example, may be displayed in the middle portion of the Mobile Application 510 display. Mobile Application 510 may also contain Subject Control Buttons 530 which may comprise Garage Open/Close buttons, for instance. In this example, if a user presses one of Subject Control Buttons 530, software running on Internal Computer Hardware 110 may activate controls to open or close a garage door. Mobile Application 510 may provide a visible confirmation that the garage is activated. One embodiment, in a video mode, a user may be able to see an opening or closing of the garage door from the screen, or the opened or closed status of the garage door. In another embodiment, Mobile Application 510 may present a still-image picture view instead of a video view, may auto-refresh at a pre-determined rate, 12 seconds for example, or may give a user the option to press a Refresh Button 540 to see updated pictures, which may, for example, allow optimization for the use of mobile data plan.

Mobile Application 510 may also provide for speech-based commands or gesture controls, so that a user may, for example, shake the smartphone to trigger voice command that can open, close a garage door, check for status of the garage door or other device coupled to IP Camera Smart Controller 100.

Mobile Application 510 may allow a user to configure various settings. For example, a user may configure it to send an email, SMS or native app notification when a garage door is opened, after it has been open for ten minutes, and every ten minutes after that. A user may also configure that a garage door should close if it has been open for a specified period of time. One having skill in the art will recognize that many different configuration options may be available.

Figure 6:
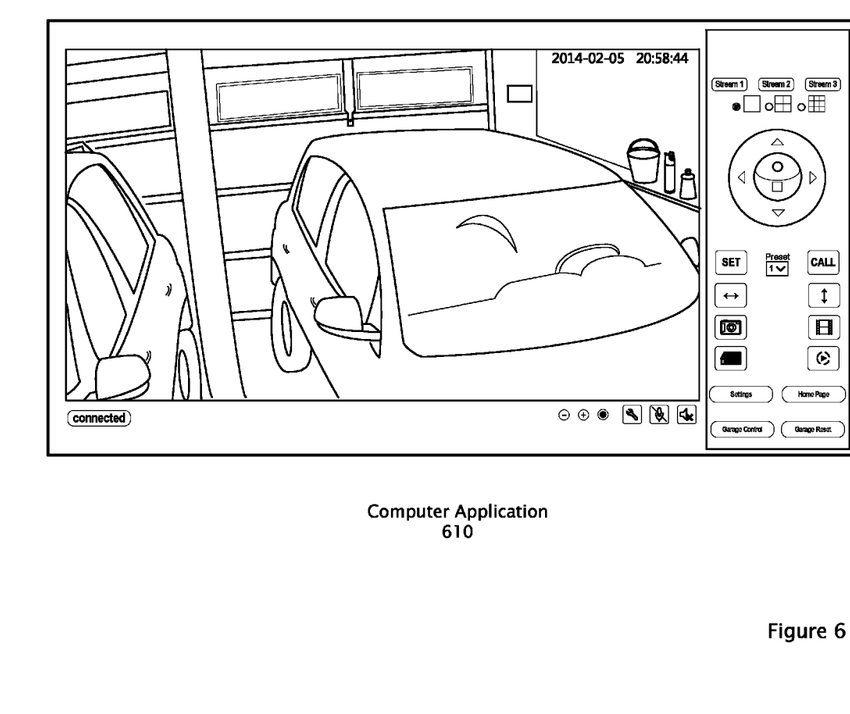
FIG. 6 illustrates a computer application which may run in conjunction with an IP Camera Smart Controller, according to one embodiment.

FIG. 6 illustrates Computer Application 610 which may run in conjunction with an IP Camera Smart Controller, according to one embodiment. In this example, the Computer Application 610 may run on a Windows PC, an Apple Computer, a Linux-based PC or any device that is connected to the internet with browser access. This may provide granular settings to the user with an HD video view. A user may be able to select from three different resolutions streams; for example, a first stream may comprise a high resolution of 1280×720 pixels, a second stream may comprise 640×360 pixels, and a third stream may comprise 320×180 pixels.

Additional controls may be provided to allow the users to pan and tilt, and to also pre-program the camera location with multiple preset positions, for example. Other buttons may include the ability to take a snapshot, video record directly to a smartphone, SD card viewing of saved and "motion-detected" videos and pictures. In the garage door context, a garage control button may also be provided to open and close the garage door.

One having skill in the art will recognize that other computers may be used to host Computer Application 610 and that various resolutions of video may be available.

Figure 7:
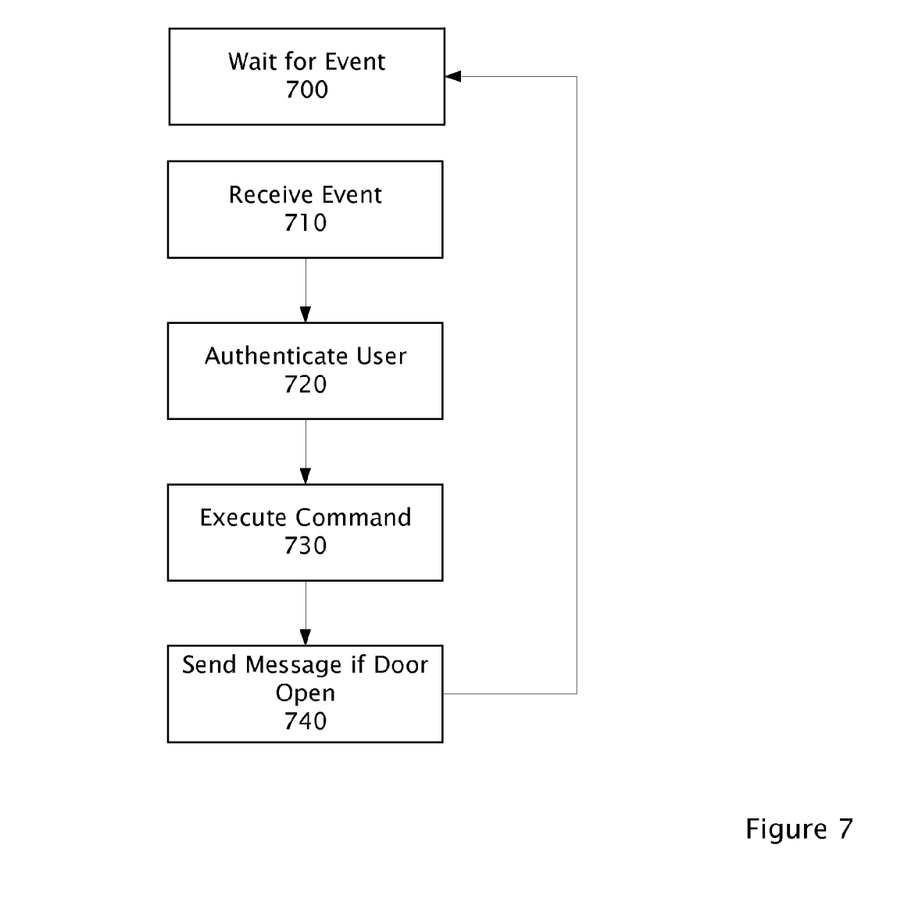
FIG. 7 is a flow diagram illustrating an example of an application for IP Camera Smart Controller according to one embodiment.

FIG. 7 is a flow diagram illustrating an example of one application for IP Camera Smart Controller according to one embodiment. IP Camera Smart Controller 510 may Wait for Event 700. IP Camera Smart Controller 510 may Receive Event 710 from a User Device 820. For example, a user may send a command to open a garage door. IP Camera Smart Controller 510 may Authenticate User 720. Authentication may be done in several ways, including recognizing User Device 820, having the user log in, using biometric identification techniques, or other verification means. One having skill in the art will recognize that many types of verification may be used.

If the first user is verified as authorized to execute the command, IP Camera Smart Controller 510 may Execute Command 730. For example, to open the garage door, a signal may be sent through Output Pins 240. If so configured, IP Camera Smart Controller 510 may then send the first user or a second user a message, such as an email or text message, indicating the garage door is opened. The message may contain a picture or video, which may provide visual confirmation of a state of the garage door. Two-way communication may also be used between User Device 820 and IP Camera Smart Controller 510 so that the first user may view live video or perform other activities.

IP Camera Smart Controller 510 may then Wait for Event 700 again.

One having skill in the art will recognize that various applications may be performed in response to many various events, and that events may include, for example, detecting a door is opening, detecting the door is closing, receiving a request to open the door, and receiving a request to close the door. Additionally, multiple devices may be controlled and monitored.

Figure 8:
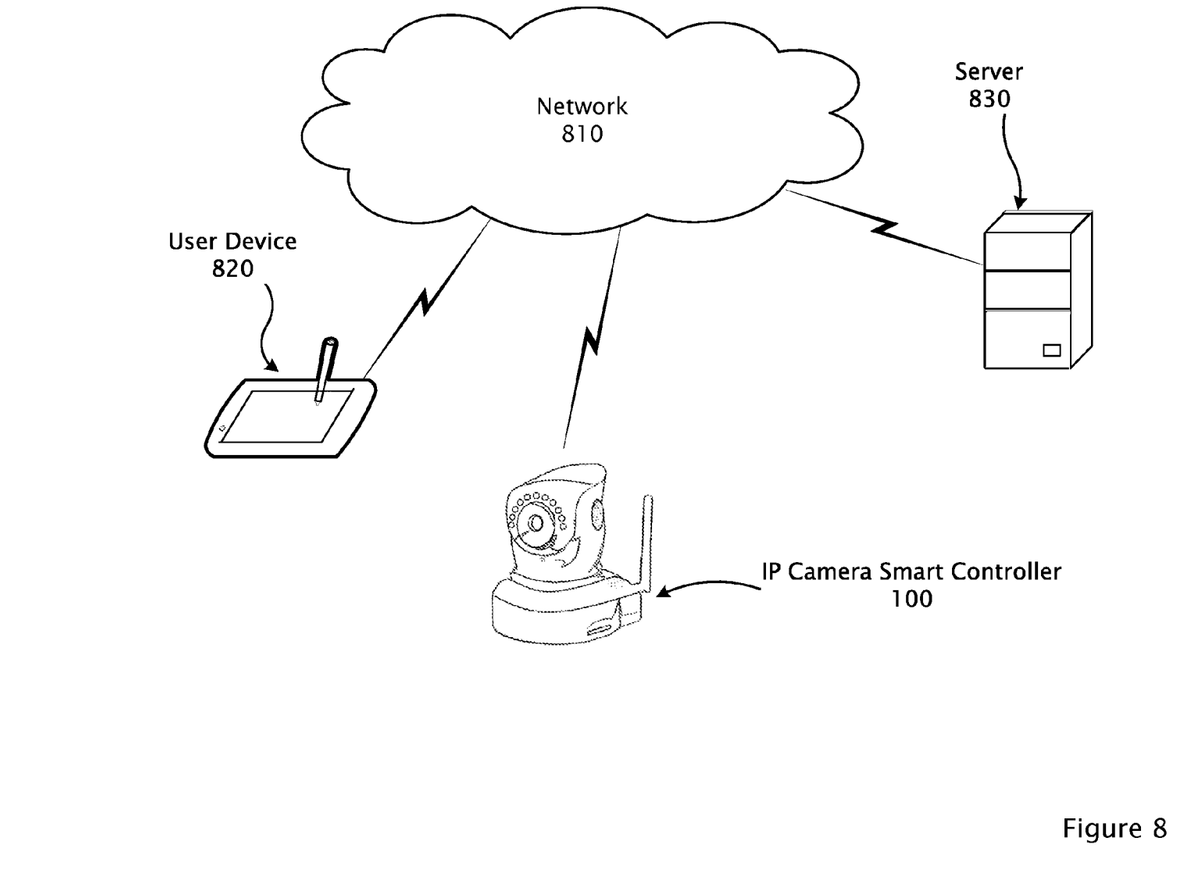
FIG. 8 is a diagram illustrating an example of a system capable of supporting IP Camera Smart Controller according to one embodiment.

FIG. 8 is a diagram illustrating an example of a system capable of supporting IP Camera Smart Controller according to one embodiment.

Network 910 may include Wi-Fi, cellular data access methods, such as 3G or 4GLTE, Bluetooth, near-field communications (NFC), the internet, local area networks, wide area networks, or any combination of these or other means of providing data transfer capabilities. In one embodiment, Network 910 may comprise Ethernet connectivity. In another embodiment, Network 910 may comprise fiber optic connections.

User Device 820 may be a smartphone, tablet, laptop computer, or other device with location-based services, for example GPS, cellphone tower triangulation capability, IP address location, or accelerometers, and may have network capabilities to communicate with IP Camera Smart Controller 100.

Server 830 may be conventionally constructed or may be designed specifically to enhance communications and functionality of IP Camera Smart Controller 100 and User Device 820.

IP Camera Smart Controller 100 may establish a connection with Server 830 via Network 810. User Device may also establish a connection with Server 830 via Network 810. User Device 820 may then communicate with IP Camera Smart Controller 100, either directly through information received from Server 830, or by passing communications through Server 830, allowing commands and data to be transferred between User Device 820 and IP Camera Smart Controller 100.

Figure 9:
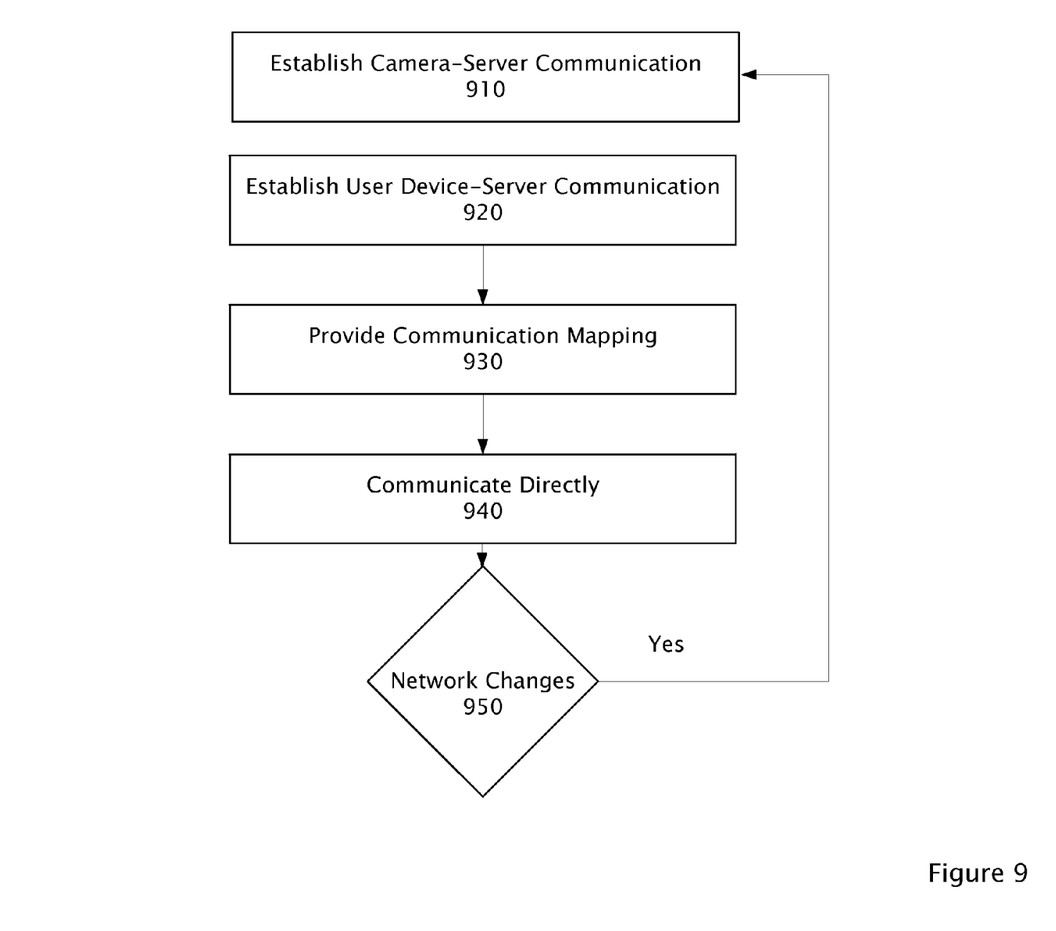
FIG. 9 is a flow diagram illustrating a process for IP Camera Smart Controller according to one embodiment.

FIG. 9 is a flow diagram illustrating a process for IP Camera Smart Controller according to one embodiment.

At Establish Camera-Server Communication 910, a UDP packet may be sent from IP Camera Smart Controller to Server 830, which may be connected to a network which is connected to the Internet. Server 830 may be running, for example, a server program, and may be running in Amazon Web Services®, Azure™ or another public cloud service. This may create a mapping for IP Camera Smart Controller 100 source address and port to Server 830 and may allow traffic flow between Server 830 and IP Camera Smart Controller 100. A router may directly determine and map the port number, which may allow communication to happen.

At Establish User Device-Server Communication 920, an application may be running on User Device 820, which may be connected to a second network or a device providing network address translation (NAT). User Device 820 may have a known Unique ID to identify IP Camera Smart Controller 100, and may on startup connect to Server 830. This may create a mapping for the application a source address and port to Server 830, and may allow traffic flow from the application to Server 830. A login or other way of identifying, authenticating, or authorizing the application to access IP Camera Smart Controller 100 may be required.

At Provide Communication Mapping 930, Server 830 with proper authorization may provide a port number and address to both IP Camera Smart Controller 100 and the application, so IP Camera Smart Controller 100 may have the UDP port number and address for the application and the application may have the UDP port number and address of IP Camera Smart Controller 100.

At Communicate Directly 940, the application may communication directly to IP Camera Smart Controller 100, which may communicate directly peer-to-peer (P2P) with the application using the established mappings.

If either Network Changes 950, IP Camera Smart Controller 100 or the application may repeat the same process to re-establish communications.

In another embodiment, a relay may be used. For example, communication between IP Camera Smart Controller 100 and application may use Server 830 as an intermediary in the event that direct P2P communication cannot be established. In yet another embodiment, web communication via TCP and port forwarding may be established.

Figure 10:
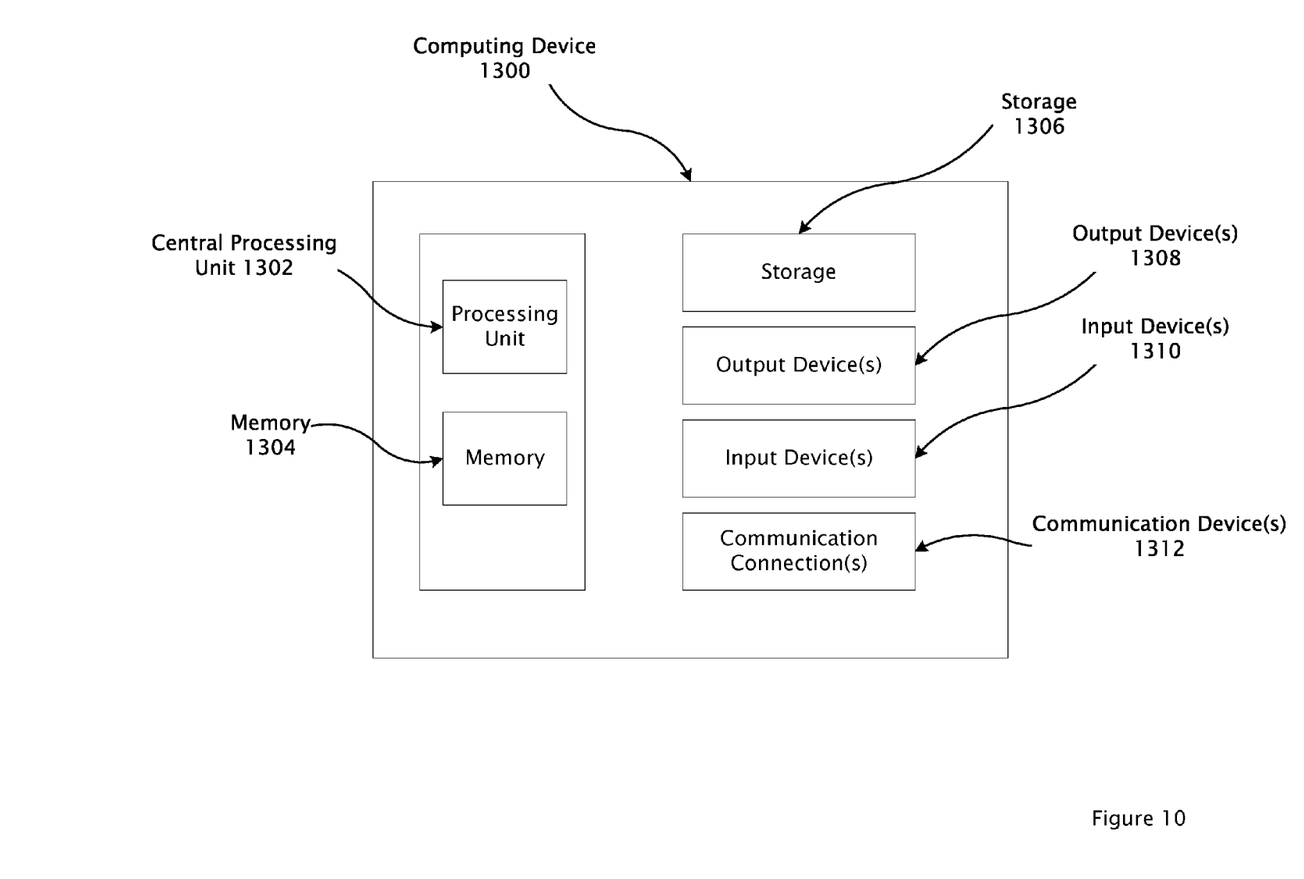
FIG. 10 is a component diagram of a computing device which an IP Camera Smart Controller process may include according to one embodiment.

FIG. 10 is a component diagram of a computing device which IP Camera Smart Controller 100 may include according to one embodiment. Computing Device 1300 can be utilized to implement one or more computing devices, computer processes, or software modules described herein, including, for example, but not limited to a User Device 820 or Server 830. In one example, Computing Device 1300 can be used to process calculations, execute instructions, and receive and transmit digital signals. In another example, Computing Device 1300 can be utilized to process calculations, execute instructions, receive and transmit digital signals, receive and transmit search queries and hypertext, control internet of things and objects, and compile computer code suitable for a mobile or embedded device. Computing Device 1300 can be any general or special purpose computer now known or to become known capable of performing the steps and/or performing the functions described herein, either in software, hardware, firmware, or a combination thereof In its most basic configuration, Computing Device 1300 typically includes at least one Central Processing Unit (CPU) 1302 and Memory 1304. Depending on the exact configuration and type of Computing Device 1300, Memory 1304 may be volatile (such as RAM), non-volatile (such as ROM, flash memory, etc.) or some combination of the two. Additionally, Computing Device 1300 may also have additional features/functionality. For example, Computing Device 1300 may include multiple CPU's. The described methods may be executed in any manner by any processing unit in computing device 1300. For example, the described process may be executed by both multiple CPU's in parallel.

Computing Device 1300 may also include additional storage (removable and/or non-removable) including, but not limited to, magnetic or optical disks or tape. Such additional storage is illustrated in FIG. 8 by Storage 1306. Computer readable storage media include volatile and nonvolatile, removable and non-removable media implemented in any method or technology for storage of information such as computer-readable instructions, data structures, program modules or other data. Memory 1304 and Storage 1306 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 1300. Any such computer-readable storage media may be part of computing device 1300. But computer readable storage media do not include transient signals.

Computing Device 1300 may also contain Communications Device(s) 1312 that allow the device to communicate with other devices. Communication Device(s) 1312 may include wired network devices, such as Ethernet or USB ports, or wireless devices, such as devices that support Wifi networks, NFC, Bluetooth, or other wireless technologies. For example, Communication Device(s) 1312 may include wireless transmitters and wireless receivers Communications Device(s) 1312 may use communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. The term computer-readable media as used herein includes both computer-readable storage media and communication media. The described methods may be encoded in any computer-readable media in any form, such as data, computer-executable instructions, and the like.

Computing Device 1300 may also have Input Device(s) 1310 such as keyboard, mouse, pen, voice input device, touch input device, etc. Output Device(s) 1308 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Like reference numerals are used to designate like parts in the accompanying drawings. A more particular description of certain embodiments of IP Camera Smart Controller may be had by references to the embodiments shown in the drawings that form a part of this specification, in which like numerals represent like objects. While the detailed description above has been expressed in terms of specific examples, those skilled in the art will appreciate that many other configurations could be used Accordingly, it will be appreciated that various equivalent modifications of the above-described embodiments may be made without departing from the spirit and scope of the invention.

Additionally, the illustrated operations in the description show certain events occurring in a certain order. In alternative embodiments, certain operations may be performed in a different order, modified or removed. Moreover, steps may be added to the above-described logic and still conform to the described embodiments. Further, operations described herein may occur sequentially, or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. It is intended that the scope of the invention be limited not by this detailed description, but rather by the claims appended hereto. The above specification, examples and data provide a complete description of the manufacture and use of the invention. Since many embodiments of the invention can be made without departing from the spirit and scope of the invention, the invention resides in the claims hereinafter appended.

The invention claimed is:

1. A system, comprising:
   a housing;
   a processor disposed in the housing;
   a memory, disposed in the housing, operatively coupled to the processor;
   a camera, disposed in the housing, operatively coupled to the processor;
   a wireless receiver, disposed in the housing
   a wireless transmitter, disposed in the housing
   a plurality if output pins, disposed in the housing, operatively coupled to the processor;
   a plurality of input pins, disposed in the housing, operatively coupled to the processor;
   instructions stored on the memory which, when executed, perform a method, comprising:
      receiving, via the wireless receiver, a command from a user;
      authenticating the user to confirm the user has authority to request the command;
      executing the command by sending at least one signal to one or more of the output pins;
      confirming the command has been executed by testing a state of one or more of the input pins; and
      sending, via the wireless transmitter, the user a notification, the notification comprising an image or video verifying the command was executed.

2. The system of claim 1, further comprising a magnetic switch coupled to at least one input pin, the magnetic switch configured to provide confirmation the command has been executed.

3. The system of claim 1, further comprising a garage door opener coupled to at least one output pin, the garage door opener configured to open or close a garage door in response to the signal sent to the output pins.

4. A method, comprising:
   receiving, at a networked camera controller, a non-transient signal from a user via the network, the signal requesting an action for a connected device;
   sending, in response to the received signal, a non-transient signal, the sent signal causing the requested action be performed by the connected device;
   confirming, by testing a state of one or more of the input pins,
   that the command has been executed; and
   sending to the user, via the network, an image or video from a camera coupled to the networked camera controller, confirming the action was performed by the connected device.

5. The method of claim 4, wherein the connected device comprises a garage door opener.

6. The method of claim 5, wherein the action comprises closing a garage door.

7. The method of claim 5, wherein the action comprises opening a garage door.

8. The method of claim 4, wherein the connected device comprises a gate opener.

9. The method of claim 8, wherein the action comprises closing a gate.

10. The method of claim 8, wherein the action comprises opening a gate.

11. The method of claim 4, wherein the connected device comprises an outlet.

* * * * *